March 16, 1948.  J. S. ASKEY  2,437,990
DYNAMO-ELECTRIC MACHINE
Filed July 28, 1945
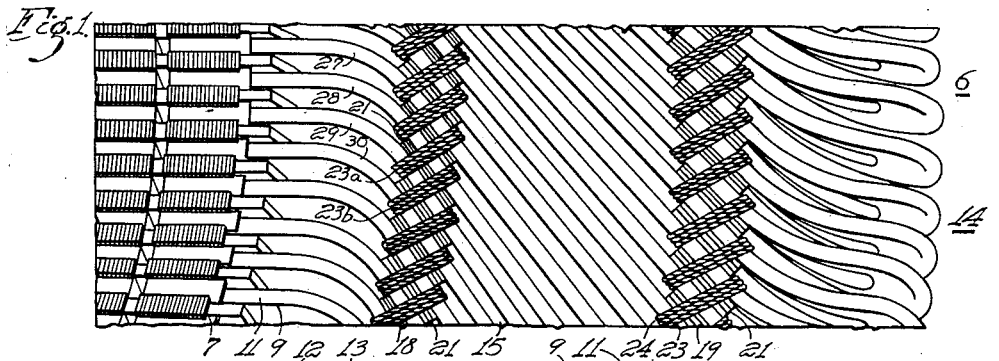
Fig. 1.
Fig. 2.
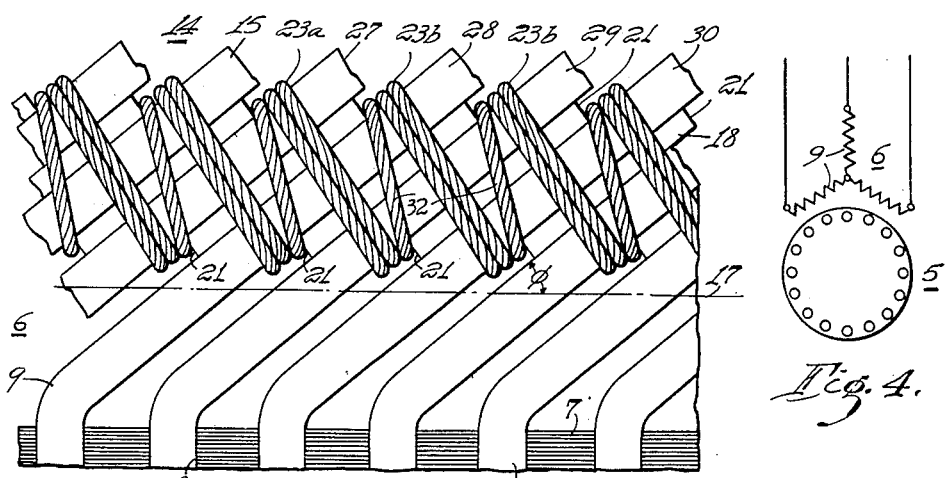
Fig. 3.
Fig. 4.
WITNESSES:
INVENTOR
John S. Askey.
BY
O. B. Buchanan
ATTORNEY Patented Mar. 16, 1948

2,437,990

UNITED STATES PATENT OFFICE 2,437,990

DYNAMOELECTRIC MACHINE

John S. Askey, Pittsburgh, Pa., assignor to Westinghouse Electric Corporation, East Pittsburgh, Pa., a corporation of Pennsylvania Application July 28, 1945, Serial No. 607,642

3 Claims. (Cl. 171—252)

My invention relates to dynamo-electric machines, and it has particular relation to a means and method for the continuous roping of an arch-bound ring of spacers for bracing the stator end-windings of a large alternating-current motor or generator.

Heretofore, it has frequently been necessary to stagger the spacers between the successive conductors of a stator end-winding, because there has not been room for the twine which has been used for individually roping each spacer into place, particularly where the end-winding portions extended at an angle of more than 30° or 33° with respect to the tangent to a circle parallel to the end of the stator-core. For many years, this staggered spacer-construction has been perforce tolerated, notwithstanding the fact that, every little while, a stator-winding would get ruined because of severe distortion of the end-winding conductors around the staggered spacers, as a result of across-the-line starting, or as a result of faults on the line or in the winding.

An object of my invention is to provide a new method and arrangement of roping, whereby the spacers are arranged in an arch-bound ring of spacers, by which I mean that the spacers of such an arch-bound ring are not staggered, but are all disposed at the same distance from the end of the stator-core. In my new roping arrangement and method, the total number of turns of the roping-twine, which find each spacer in place, are divided into a plurality of groups of a plurality of turns each, each group of a plurality of turns of twine extending across (n+1) straight end-winding conductors, so as to bind n spacers, where n is greater than one. Successive groups of twine-turns encircle staggered groups of (n+1) end-winding conductors.

With the foregoing and other objects in view, my invention consists of the apparatus, combination, parts, arrangements and methods hereinafter described and claimed, and illustrated in the accompanying drawing, wherein:

Figure 1 is a perspective view of a portion of the back end of a finished stator member, illustrating an application of my invention, Fig. 2 is a similar view of the connection-end of a partly wound stator, Fig. 3 is a diagrammatic development-view of a portion of an end-winding layer, representing the application of my invention, and Fig. 4 is a diagrammatic view of a three-phase motor of the type to which my invention is applicable.

As shown in Fig. 4, my invention is applicable to a dynamo-electric machine having a rotor member 5 and a stator member 6. The stator member is of a type shown in Figs. 1 and 2, having a cylindrically bored core 7, having winding-receiving slots 8. A stator winding 9 is provided, which is shown in Fig. 4 to be a three-phase primary winding of an alternating-current generator or motor. Such a machine may be either an induction motor or a synchronous generator or motor. If an induction motor, it may be of either the squirrel-cage or the wound-rotor type. For the sake of illustration, I have chosen to show a squirrel-cage rotor 5, in Fig. 4, but it is to be understood that this is only an exemplary illustration of an embodiment of the invention.

The stator winding 9, as shown in Figs. 1, 2 and 3, has coil-sides 11 which are disposed in the slots 8, and it has a plurality of layers, 12 and 13, of end-winding portions 14, each end-winding layer comprising a continuous circle of spaced, substantially straight end-winding portions 15, which are inclined at an acute angle $\phi$ with respect to the tangent to a circle 17 (Fig. 3) passing through all of the straight end-winding portions 15 of that layer, such a circle being parallel, of course, with the end of the core 7.

It is necessary to brace the straight end-winding portions 15 at one or more points along their lengths, in order to hold the same in place, against the distorting forces which result from the magnetic forces of attraction and repulsion, which may become very large as a result of the heavy current-flow which occurs during abnormal operating-conditions, such as fault-conditions, or even as a result of across-the-line starting of the machine.

In accordance with my invention, I apply one or more arch-bound rings, 18 and 19, of short spacers 21, which are disposed in the spaces between the successive spaced straight end-winding portions 15 of each of the end-winding layers 12 and 13, separate bracing being applied for each one of these layers 12 and 13. In accordance with my invention, all of the spacers 21 which are composed in any ring, 18 or 19, of arch-bound spacers are disposed at substantially the same distances from the end of the core 7, which is to say that these spacers are arranged in an arch-bound ring, as distinguished, for example, from a staggered construction.

In accordance with my invention, a roping-means is provided for each of the arch-bound rings 18 and 19 of spacers 21, each roping-means comprising a plurality of groups 23 of a plurality of turns of twine 24, extending at substantially right angles across ($n+1$) straight end-winding portions 15, so as to bind $n$ spacers, $n$ being any integer greater than one. Successive groups 23 of twine-turns encircle staggered groups of ($n+1$) strand end-winding portions 15. Thus, if one twine-group 23a is bound around three successive end-winding conductors 27, 28, 29, the next twine-group 23b will extend around the end-winding conductors 28, 29, 30. In the preferred form of construction, which is shown in the drawing, there are two twine-groups 23 for binding each spacer 21 in place, and the integer $n$ is 2.

Any necessary number of twine-turns may be utilized in each twine-group 23. In the illustrated form of embodiment of my invention, using the best and strongest twine 24 available, I utilize three turns in each twine-group 23, or rather, I utilize 2½ complete turns in each group such as 23a, using the last half-turn to pass over to the next twine-group 23b, as shown at 32 in Figs. 2 and 3. It will be understood, of course, that any adequate number of turns may be provided, for providing the requisite binding-strength.

It will be noted that the spacers 21 are of relatively short lengths, so as not to cover too great a proportion of the total length of the substantially straight end-winding portions 15, but the length of the spacers 21 is sufficient, considering the angle $\phi$ and the space required by the requisite number of twine-turns in each twine-group 23, so that the described roping-procedure may be carried out.

My new roping-arrangement represents a considerable improvement, in bracing stator end-windings without increasing the required amount of twine, over that which has previously been needed to rope staggered rows of spacers. It will also be noted that I have avoided the necessity for staggering successive spacers, so that I can obtain a firm arch-bound effect, which does not result in so badly twisting the straight end-winding portions 15, as a result of abnormal current-conditions, that a winding-failure results.

While I have illustrated my invention in only one preferred form of embodiment, I desire it to be understood that my invention is susceptible of being embodied in several different forms, and I desire that the appended claims shall be accorded construction consistent with their language.

I claim as my invention:

1. A dynamo-electric machine having a rotor member and a stator member, the stator member having a cylindrically bored core having winding-receiving slots, a winding having coil-sides in said slots and having a plurality of layers of end-winding portions, each end-winding layer comprising a continuous circle of spaced, substantially straight end-winding portions, inclined at an acute angle with respect to the tangent of a circle passing through all of the straight end-winding portions of that layer, one or more arch-bound rings of short spacers disposed in the spaces between the successive spaced, substantially straight end-winding portions of each end-winding layer, all of the spacers which are comprised in any ring of arch-bound spacers being disposed at substantially equal distances from the end of the core, and a roping-means for each arch-bound ring of spacers, each roping-means comprising a plurality of groups of a plurality of turns of twine for binding each spacer in place between its adjacent straight end-winding portions, each group of a plurality of turns of twine extending at substantially right angles across ($n+1$) straight end-winding portions, so as to bind $n$ spacers, where $n$ is greater than one, successive groups of twine-turns encircling groups of ($n+1$) straight end-winding portions and including a common end-winding portion or portions.

2. The invention as defined in claim 1, characterized by $n$ being 2.

3. The invention as defined in claim 1, characterized by $n$ being 2, there being two groups of twine-turns for binding each spacer in place.

JOHN S. ASKEY.

REFERENCES CITED

The following references are of record in the file of this patent:

UNITED STATES PATENTS

| Number | Name | Date |
|---|---|---|
| 936,622 | Griffith | Oct. 12, 1909 |

FOREIGN PATENTS

| Number | Country | Date |
|---|---|---|
| 120,081 | Switzerland | June 22, 1926 |